US012170801B2

(12) United States Patent
Shen et al.

(10) Patent No.: US 12,170,801 B2
(45) Date of Patent: Dec. 17, 2024

(54) SERVER-SIDE FRAME RENDER TIMING DELAY TO REDUCE CLIENT-SIDE FRAME PRESENT DELAY

(71) Applicants: ADVANCED MICRO DEVICES, INC., Santa Clara, CA (US); ATI TECHNOLOGIES ULC, Markham (CA)

(72) Inventors: Yuping Shen, Orlando, FL (US); Min Zhang, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 84 days.

(21) Appl. No.: 18/078,603

(22) Filed: Dec. 9, 2022

(65) Prior Publication Data

US 2024/0196033 A1 Jun. 13, 2024

(51) Int. Cl.
*H04N 21/262* (2011.01)
*H04N 19/164* (2014.01)
*H04N 19/172* (2014.01)
*H04N 21/658* (2011.01)

(52) U.S. Cl.
CPC ....... *H04N 21/2625* (2013.01); *H04N 19/164* (2014.11); *H04N 19/172* (2014.11); *H04N 21/658* (2013.01)

(58) Field of Classification Search
CPC ............. H04N 21/2625; H04N 21/658; H04N 19/164; H04N 19/172
See application file for complete search history.

(56) References Cited

U.S. PATENT DOCUMENTS

| 11,700,402 B1* | 7/2023 | Dimitrov | H04L 65/612 |
| | | | 725/144 |
| 2019/0164518 A1* | 5/2019 | Dimitrov | G09G 5/393 |
| 2021/0093966 A1* | 4/2021 | Cerny | A63F 13/44 |
| 2023/0197037 A1* | 6/2023 | Ranka | G09G 5/12 |
| | | | 345/520 |

* cited by examiner

*Primary Examiner* — Mulugeta Mengesha (57) ABSTRACT

In a cloud gaming system or other remote video streaming system, a client device and a server coordinate to introduce an adjustable delay in the frame start timing in the frame rendering pipeline at the server to reducing vertical synchronization (VSYNC) presentation latency, and thus reduce overall frame latency. In implementations, the coordination between the client device and the server includes the client device observing the current VSYNC presentation latencies in recently processed video frames reporting this observed VSYNC presentation latency to the server. The server uses this feedback to determine a frame start delay that is then used to introduce a frame start shift for an upcoming frame and subsequent frames, thereby shifting the server rendering and encoding pipeline back so that the resulting video frames are made available to present at the client device closer to their respective VSYNC signal assertions.

24 Claims, 5 Drawing Sheets

SERVER-SIDE FRAME RENDER TIMING DELAY TO REDUCE CLIENT-SIDE FRAME PRESENT DELAY

BACKGROUND

Remote, or "cloud-based," video gaming systems employ a remote server to receive user gaming input from a client device via a network, execute an instance of a video game based on this user gaming input and other context inputs, and deliver a stream of rendered video frames and a corresponding audio stream over the network to the client device for presentation at a display and speakers, respectively, of the client device. For the video content the server employs a render-and-capture process in which the server renders a stream of video frames from the video game application and an encoder encodes the pixel content of the stream of video frames into an encoded stream of video frames that is concurrently transmitted to the client device. At the client device, each encoded video frame in the encoded stream is decoded to generate a decoded video frame, and the decoded video frame is then presented to the user of the client device via an associated display panel.

In some instances, the client device is configured to utilize vertical synchronization (VSYNC) timing such that the presentation of the next video frame is trigged by a periodic VSYNC signal that provides a fixed refresh rate at the display panel of the client device, which aids in mitigating tearing and other visual artifacts. When VSYNC timing is enabled on the client device, the decoded video frame that otherwise is ready to present is held, or buffered, until the next VSYNC signal assertion, at which point the decoded video frame is presented (e.g., via a display buffer flip call in response to the VSYNC signal assertion).

Frame latency is a prominent challenge in cloud gaming impacts a user's experience. Various factors contribute to frame latency, including frame rendering latency, frame encoding latency, network latency, frame decoding latency, and the like. The implementation of VSYNC timing at the client device can further contribute to frame latency due to the delay between when a decoded frame is available to present at the client device and the subsequent occurrence of the VSYNC signal assertion that permits presentation of the decoded frame to proceed. However, reducing latency elsewhere in the pipeline, such as in improved encoding efficiency or improved decoding efficiency, often has little impact on the overall frame latency when VSYNC timing is employed as it is the VSYNC signal assertion that triggers frame presentation, and the VSYNC signal assertions occur at a fixed frequency and thus making a decoded frame available for presentation earlier in the process may merely result in a longer delay between when the decoded frame is available to present and when the VSYNC signal is asserted to permit presentation of the decoded frame. That is, because the VSYNC timing is fixed at the client device, reduction in latencies in the server-to-client display pipeline may not reduce overall frame latency in VSYNC-timed implementations.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Use of VSYNC timing at a client device in a video game streaming system typically has the unfortunate side effect of adding additional frame latency in the form of the delay between when a decoded frame is available to present at the client device and when the decoded frame is permitted to present in response to the occurrence of subsequent VSYNC signal assertion (this delay referred to herein as "VSYNC present latency"). To reduce VSYNC present latency, and thus reducing overall frame latency, FIGS. 1-6 illustrate systems and methods for dynamic control of a frame start delay shift ("frame start shift" for brevity) in a server's streaming pipeline so as to more closely align the point at which a decoded frame is available to present at the client device and the point at which the decoded frame is permitted to present in response to VSYNC timing (e.g., a VSYNC signal assertion). In at least one implementation, a video gaming server executes an instance of a video game application. This video game application instance receives gaming inputs from a user of the client device, and from these gaming inputs and other inputs and other parameters, creates a gaming world context that serves as the basis for the rendering of a stream of video frames representing visual content of the user's game play. As each video frame is rendered, video gaming server encodes the video frame along with associated audio data and metadata and transmits the resulting encoded data stream to the client device. At the client device, each video frame is extracted from the data stream, decoded, and the resulting decoded video frame is presented to the user via a display panel of, or associated with, the client device. As explained above, when VSYNC timing is activated at the client device, the presentation of each decoded video frame is triggered by a corresponding VSYNC signal assertion, which is asserted in accordance with a fixed timing corresponding to a refresh rate set for the display panel.

Thus, when VSYNC timing is activated, in at least one embodiment the client device and video game server can coordinate to introduce an adjustable delay shift in the frame start timing in the frame rendering pipeline so that the timing of when decoded video frames are available to present at the client device are shifted closer to the occurrences of the corresponding VSYNC signal assertion, which has the effect of reducing VSYNC presentation latency, and thus reduces overall frame latency. In implementations, the coordination between the client device and the server includes the client device observing the current VSYNC presentation latencies in recently processed video frames and providing feedback regarding these observed current VSYNC presentation latencies to the video game server, such as in the form of a data structure with the recent observed VSYNC presentation latencies or in the form of an average VSYNC presentation latency or other statistical representation of the set of recently observed VSYNC presentation latencies.

The video game server, in turn, determines an appropriate amount of frame start delay to introduce into the frame rendering pipeline based on the observed VSYNC presentation latency, and then controls the frame rendering pipeline so as to delay the next frame start (that is, the starting point for the rendering of the next frame at the video game server) by the determined frame start delay. This has the effect of shifting the start of rendering of the next frame by an amount of time equal to the determined frame start delay, and likewise shifting the starts of subsequent frames by the same amount (until, and unless, the frame start delay is subsequently adjusted), which in turn has the effect of shifting the point at which the decoded frame is available to present closer to the point at which the decoded frame is permitted to present due to the occurrence of the next VSYNC signal assertion. As a result, the VSYNC present latency is reduced. Moreover, while the frame start is delayed to reduce VSYNC present latency, the overall frame rendering/ encoding/transmission/decoding duration is not impacted by this delay, and thus the process appears more responsive to user gaming input and provides an improved user experience as a result.

Note that for ease of illustration, the systems and techniques of the present disclosure are described in the example context of a server-based video game system in which an instance of a video game application is executed remotely and its rendered video and audio output encoded and streamed to a client device, whereupon the client device decodes the video and audio content and presents the resulting decoded content to a user. However, these systems and techniques are not limited to a server-based gaming context, but instead may be employed in any of a variety of scenarios in which real-time video content is remotely rendered and the resulting pixel content then remotely encoded for delivery as an encoded video stream to a client device, and the client device provides for the decoding and presentation of the video content based on VSYNC timing. Thus, reference to "video game" applies equally to such equivalent scenarios unless otherwise indicated.

Figure 1:
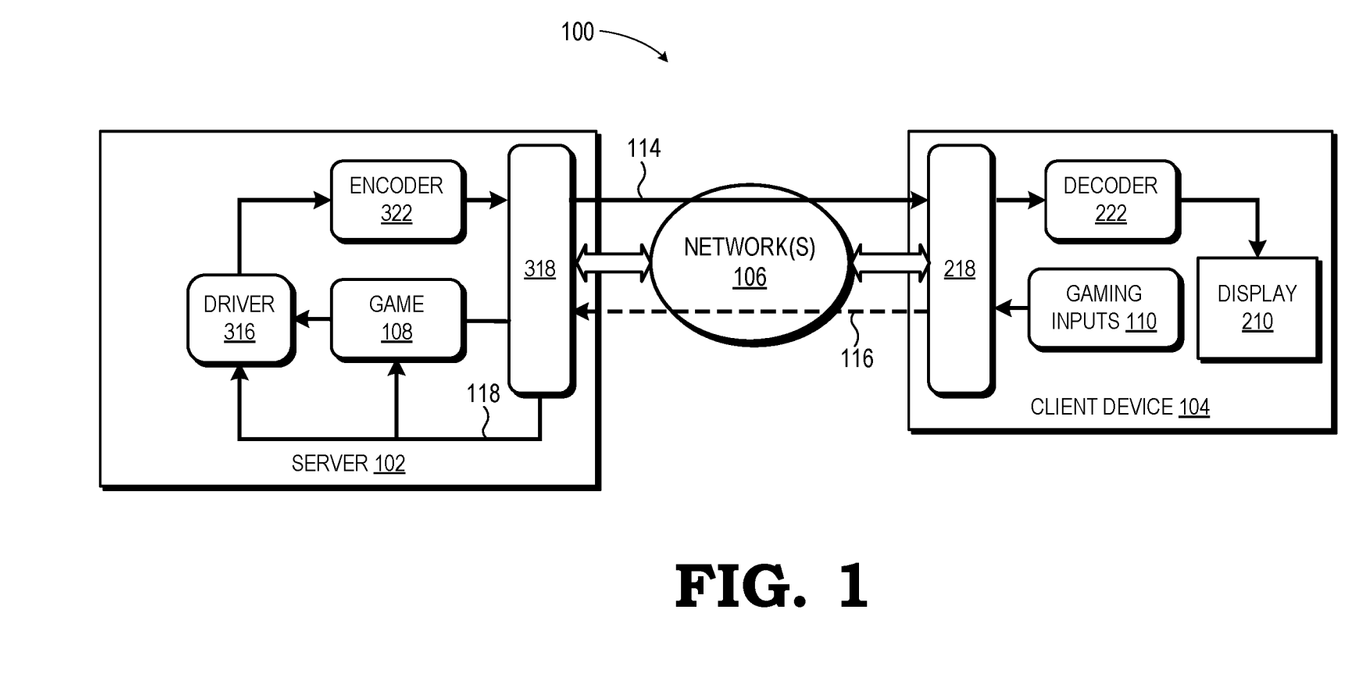
FIG. 1 is a block diagram of a server-based video gaming system utilizing dynamic frame start shifting in accordance with some implementations.

FIG. 1 illustrates a remote video gaming system 100 for providing server-based video gaming in accordance with some implementations. The remote video gaming system 100 includes a video gaming server 102 (hereinafter, "gaming server 102" for brevity) remotely connected to at least one client device 104 via one or more networks 106. The client device 104 can include, for example, a smartphone, a compute-enabled vehicle entertainment system, a compute-enabled appliance, a tablet computer, a laptop computer, a desktop computer, a video game console, a television, and the like. The one or more networks 106 can include one or more wireless networks, such as a personal area network (PAN), a cellular network, or a wireless local area network (WLAN), one or more wired networks, such as a local area network (LAN) or a wide area network (WAN), the Internet, or combinations thereof.

Figure 2:
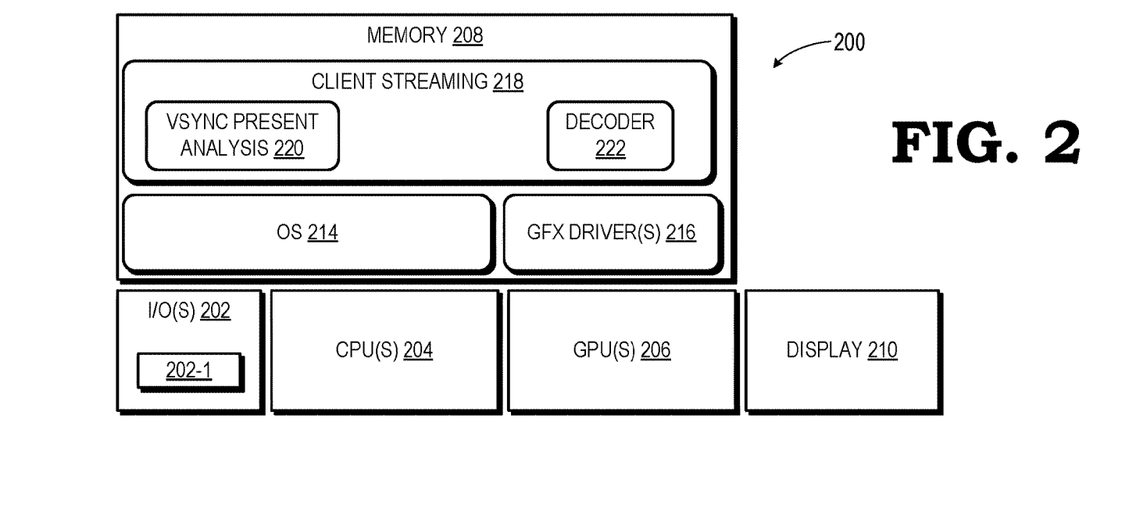
FIG. 2 is a block diagram illustrating a hardware configuration of a client device of the video gaming system of FIG. 1 in accordance with some implementations.
Figure 3:
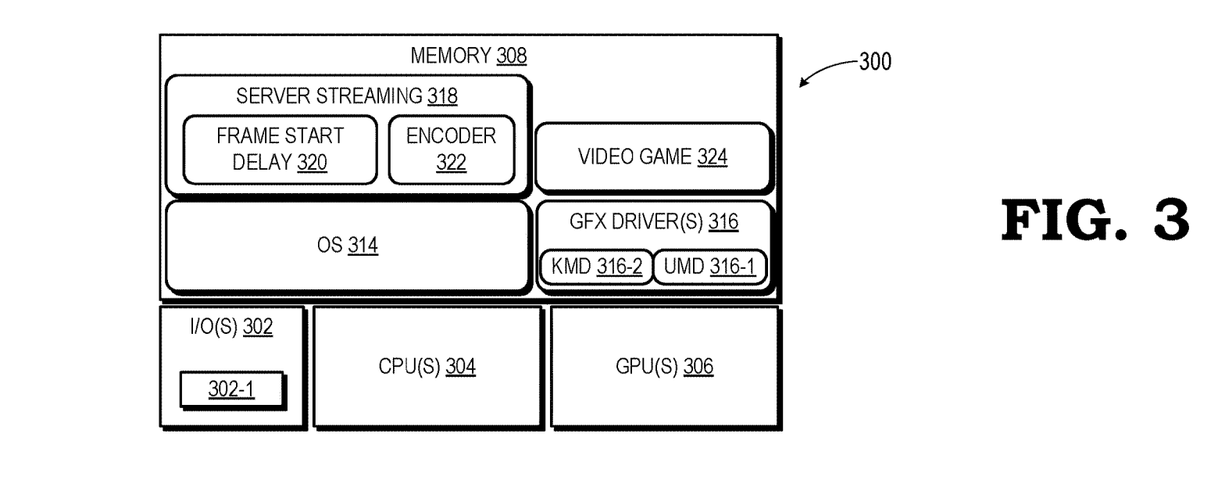
FIG. 3 is a block diagram illustrating a hardware configuration of a gaming server of the video gaming system of FIG. 1 in accordance with some implementations.

Turning briefly to FIGS. 2 and 3, example hardware configurations for the client device 104 and the gaming server 102, respectively, are illustrated. As shown in FIG. 2, the illustrated hardware configuration 200 for the client device 104 includes one or more I/O devices 202, including a network interface 202-1 for interfacing with the one or more networks 106, one or more central processing units (CPUs) 204, one or more graphics processing units (GPUs) 206, one or more memories 208, as well as a display panel 210 integrated with or otherwise connected to, the client device 104. Other well-known hardware components typically implemented at a client device, such as speakers, microphones, power supplies, busses, power managers, and the like, are omitted for clarity. The one or more memories 208 include one or more types of memory, such as random access memory (RAM), read-only memory (ROM), Flash memory, hard disc drives, register files, and the like, and store one or more sets of executable instructions that, when executed by the one or more CPUs 204 and/or the one or more GPUs 206, manipulate the hardware of the client device 104 to perform the functionality ascribed to the client device 104 herein. In particular, the executable instructions can implement an operating system (OS) 214 for overall control and coordination of the hardware components of the client device 104, a set 216 of graphics (GFX) drivers, such as a user mode driver (UMD) and a kernel mode driver (KMD) (also referred to herein collectively as graphics driver 216), for coordination and control of the one or more GPUs 206 by the one or more CPUs 204, and a client streaming application 218. The client streaming application 218 in turn includes a VSYNC present analysis module 220 for providing the gaming server 102 with analysis of current VSYNC present latencies at the client device 104, as described below, as well as a decoder 222 that operates to decode encoded video frames received from the gaming server 102 and buffered in, for example, an input queue (not shown) implemented in the one or more memories 208.

As shown in FIG. 3, the illustrated hardware configuration 300 for the gaming server 102 includes one or more I/O devices 302, including a network interface 302-1 for interfacing with the one or more networks 106, one or more CPUs 304, one or more GPUs 306, and one or more memories 308 (e.g., RAM, ROM, flash memory, hard disc drives, or a combination thereof). Other well-known hardware components typically implemented at gaming server, such as power supplies, busses, power managers, and the like, are omitted for clarity. The one or more memories 308 store one or more sets of executable instructions that, when executed by the one or more CPUs 304 and/or the one or more GPUs 306, manipulate the hardware of the gaming server 102 to perform the functionality ascribed to the gaming server 102 herein. In particular, the executable instructions can implement an OS 314 (and hypervisor for a multi-tenancy implementation) for overall control and coordination of the hardware components of the gaming server 102, a set 316 of graphics (GFX) drivers, such as a KMD 316-2 and a UMD 316-1 (also referred to herein collectively as graphics driver 316), for coordination and control of the one or more GPUs 306 by the one or more CPUs 304, and a server streaming application 318. The server streaming application 318 in turn includes a frame start delay analysis module 320 for coordination with the VSYNC present analysis module 220 of the client device 104 for dynamically setting and adjusting a frame start delay in a frame rendering pipeline of the gaming server 102, as described below, as well as an encoder 322 that operates to encode video frames rendered by an executing instance of a video game application 324.

Figure 4:
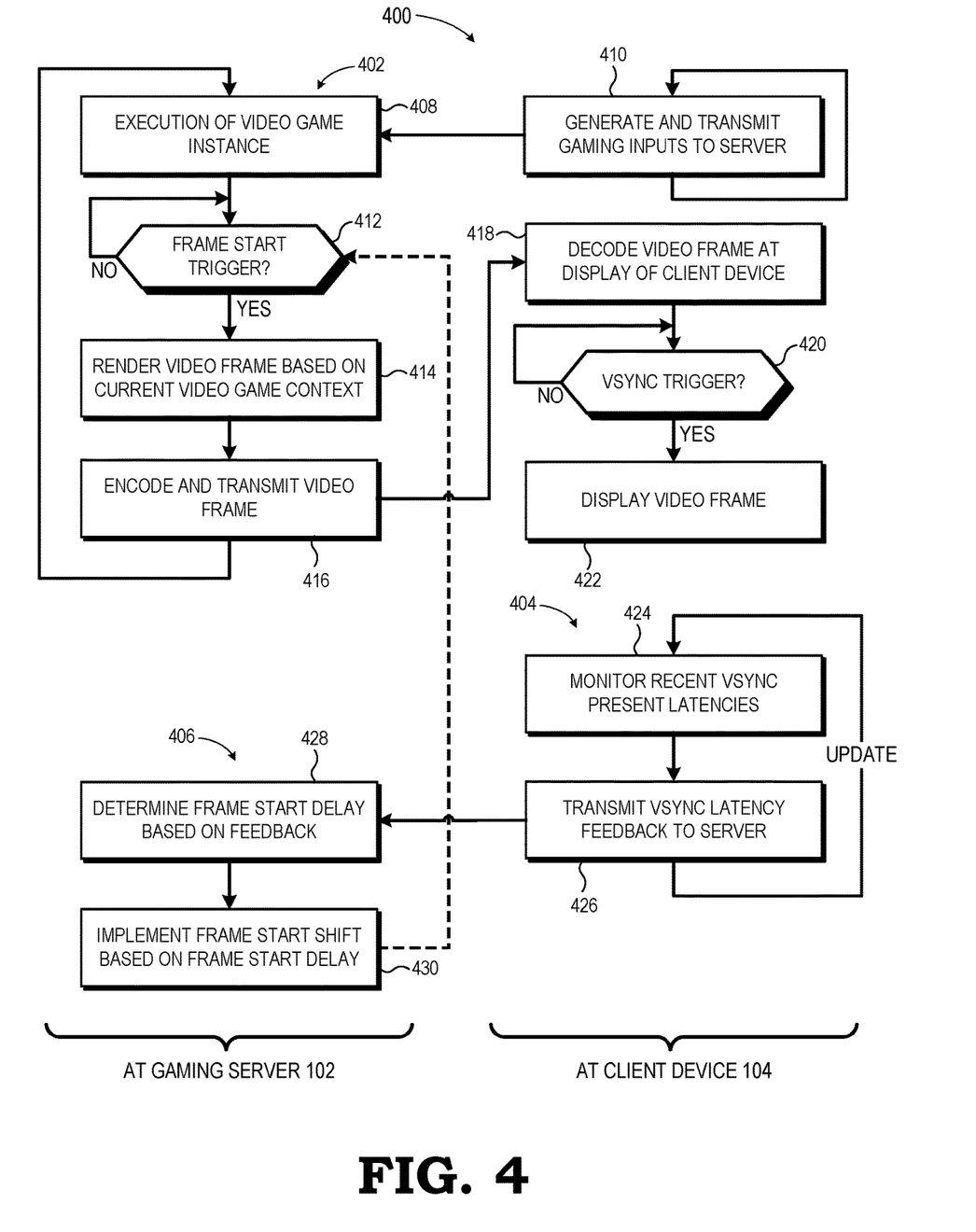
FIG. 4 is a flow diagram illustrating a method for dynamic frame start shifting at a gaming server based on observed frame present latencies observed by the client device in accordance with some embodiments.

Referring now to FIG. 4, a method 400 for remote gaming with dynamically adjustable frame start shifting to reduce VSYNC present latency for the video game system 100 of FIGS. 1-3 is illustrated in accordance with at least one implementation. While the method 400 is described in the example context of the video game system 100 of FIG. 1 and the corresponding hardware configurations of the client device 104 and the gaming server 102 of FIGS. 2 and 3, respectively, the method 400 may be implemented in other scenarios in which video content is rendered remotely and the corresponding pixel content encoded and transmitted in real time using the guidelines provided herein. The illustrated method 400 includes three concurrently-performed subprocesses: a video game streaming subprocess 402 performed by the gaming server 102 and the client device 104 in combination, a client feedback subprocess 404 performed by the client device 104, and a frame start delay configuration subprocess 406 performed by the gaming server 102. To facilitate understanding, the method 400 is arranged in FIG. 4 such that the processes performed by the gaming server 102 are represented by blocks located on the left side of FIG. 4, while the processes performed by the client device 104 are represented by blocks located on the right side of FIG. 4.

Turning first to the video game streaming subprocess 402, at block 408 the gaming server 102 executes an instance 108 (FIG. 1) of the video game application 324 (hereinafter, "video game instance 108") on behalf of the client device 104. In at least one implementation, the execution of the video game instance 108 is responsive to gaming inputs 110 (FIG. 1) received at one or more I/O devices 202 of the client device 104, such as a keyboard, mouse, gamepad, game controller, or touchscreen, and transmitted to the gaming server 102 by the client streaming application 218 via the one or more networks 106 (block 410). These gaming inputs 110 are provided as inputs to the executing video game instance 108 via the server streaming application 318 and the graphics driver 316, which adjusts the game play in response to the gaming inputs 110. Moreover, in some instances, the video game instance 108 is part of a multiple-player video game, in which case the user gaming inputs from other client devices are provided to the video game instance 108 as well.

A rendering pipeline composed of the video game instance 108, the UMD 316-1, the KMD 316-2, and the OS 214 operates to render a data stream 114 of video frames, each of which represents the visual or graphical content of a current aspect of the executing video game instance 108 at a corresponding time slice, such as the current state of the game play from a corresponding perspective, a menu screen, and the like. The rate at which the video frames are rendered is based on an indicated frame rate, such as an advertised frame rate of the display panel 210 of the client device 104 or a frames-per-second (FPS) cap specified at the gaming server 102. Generally, this process is initiated by a frame start trigger indicating the start, or commencement, of the frame rendering process. In implementations that make use of application programming interfaces (APIs) to control frame rendering and/or capture, such as with Microsoft DirectX APIs, the video game instance 108 renders a video frame, makes a present call to the API, and then proceeds to the rendering of the next video frame. As such, the present call issued by the video game instance 108 signaling completion of rendering of the previous frame thus also can signal the start of rendering of the next frame, and thus serve as a frame start trigger. In particular, absent frames-per-second (FPS) capping by the video game instance 108 itself, upon return of a present call, the video game instance 108 continues to the next frame. Accordingly, at block 412, the rendering pipeline of the gaming server 102 monitors for the issuance of a present call or other suitable frame start trigger, in response to which at block 414 the rendering pipeline initiates the process of rendering the next video frame in the stream. Generally, the process of rendering a frame from the executing video game instance 108 includes simulating an in-game world or other world simulation based on the gaming inputs 110 and other gaming parameters and context indicators received since the previous frame was rendered, and then the video game instance 108 issues a series of rendering jobs representing some visual representation of a time slice of the current state of the world simulation to the UMD 316-1, which in turn cooperates with the KMD 316-2 and OS 314 to control the GPU(s) 306 and other rendering resources to render a frame (or surface) of pixels representing this visual representation. When the rendering of the current frame is complete (as indicated by, for example, the video game instance 108 issuing a present call), at block 416 the UMD 316-1 directs the encoder 322 to encode the rendered video frame to generate an encoded video frame using any of a variety of video encoding protocols. The server streaming application 318 then transmits the data of the encoded video frame as part of the data stream 114 for reception by the client device 104 via the one or more networks 106. A stream of audio data (not shown) representing corresponding audio content is also generated by the gaming server 102 and then encoded for inclusion as an encoded audio stream as part of the transmitted data stream 114. This subprocess then repeats for the generation, encoding, and transmission of the next video frame at the indicated frame rate.

For each rendered and encoded video frame included in the data stream 114, at block 418 the client streaming application 218 extracts the data representing the encoded video frame from the received data stream 114 and provides the data to the decoder 222 via the graphics driver 216. The decoder 222 decodes the encoded video frame to generate a decoded video frame, which is then buffered in a flip buffer or other frame buffer for subsequent display presentation. At this point, the decoded video frame is ready/available for presentation at the display panel 210. However, in this implementation the client device 104 is configured to utilize VSYNC timing such that the presentation of each decoded video frame at the display panel 210 is triggered by a corresponding VSYNC signal assertion issued by the graphics driver 216 and processed by the OS 214 to control the display hardware. Accordingly, at block 420, the graphics driver 216 holds back the presentation of the available decoded video frame until the next VSYNC signal assertion is issued (that is, until the next VSYNC trigger), in response to which the graphics driver 216 permits display (i.e., presentation) of the decoded video frame at the display panel 210 to proceed at block 422.

As described above, the use of VSYNC timing can contribute to overall frame latency due to the VSYNC present latency between when the decoding of an encoded video frame is completed and thus the decoded video frame is available for presentation (block 418) and when the presentation of the decoded video frame actual occurs (block 422) in response to the next VSYNC signal assertion following the decoded video frame being made available for presentation. Acceleration of certain pipeline processes, such as rendering, encoding, transmission, and decoding typically do not reduce overall frame latency when VSYNC timing is implemented as these accelerations typically only result in the decoded frame being made available even more in advance of the next VSYNC signal assertion; that is, because the VSYNC signal period is fixed (relatively), steps to make the decoded video frame available for presentation earlier typically only result in an increased VSYNC present latency that counteracts the other decreases in latencies in the overall frame latency.

Thus, in at least one embodiment, the remote gaming system 100 employs a dynamic frame start shift process that introduces an adjustable frame start delay that shifts back the frame start of one or more subsequent frames, which in turn shifts back the points in time at which the resulting decoded frames are available for presentation closer to their respective VSYNC signal assertions, and thus decreases the VSYNC present latencies for the one or more frames with this delayed frame start shift. Moreover, unless/until the frame start delay is adjusted or otherwise modified, this frame start shift introduces only a one-time delay in the frame latency for one frame, and thereafter can maintain the original frame latency (assuming all contributive latencies, such as rendering, encoding, transmission, and decoding latencies, remain the same).

To illustrate, assume a VSYNC-activated frame rate of 60 FPS, which results in a frame period, and thus VSYNC signal assertion period, of approximately 16.667 milliseconds (ms). If the decoded video frames are regularly available approximately 6 ms before each following VSYNC signal assertion, the VSYNC present latency is 6 ms—that is, each decoded frame has to wait 6 ms after it is ready to present before it is actually permitted to present due to the wait for the VSYNC signal assertion. However, if a one-time 4 ms delay is introduced in the frame start of the next frame to be rendered, this shifts the start of the next frame by 4 ms, as well as shifting every frame thereafter by 4 ms as well. Assuming a constant frame latency, this will have the effect of shifting the point in time when each decoded frame is available to present 4 ms closer to the corresponding VSYNC trigger, or only 2 ms prior to the corresponding VSYNC trigger in the example above. Thus, with introduction of this one-time frame start delay of 4 ms, the VSYNC present latency of the next frame and subsequent frames is reduced from 6 ms to 2 ms. Moreover, this frame start delay increases the frame duration/latency for only one frame—the first frame following the frame start delay. After this shift occurs, the subsequent frames maintain their same frame duration, albeit delayed relative to the previous timing. Using the example, above, introduction of the 4 ms frame start shift causes the frame rendering process for the first frame (frame 1) following the introduction of the frame start shift to complete X+4 ms following completion of the frame rendering process for the last frame (frame 0) prior to introduction of the frame start shift, where X=the default frame rendering process time at the indicated frame rate (e.g., 16.667 ms for 60 FPS). However, for each subsequent frame (frames 2, 3, 4), the frame rendering process remains X ms. Thus, introduction of this frame start shift causes a single instance of frame presentation jitter while benefitting from reduced VSYNC present latency for the frames following the introduction of the frame start shift.

As explained, this dynamic frame start shift process seeks to reduce the current VSYNC present latency by introducing a one-time delay in the frame start for an upcoming frame to be rendered, which in turn shifts the frame starts of the following frames as a result. Thus, in at least one embodiment, the method 400 utilizes subprocesses 404 and 406 to determine and implement a suitable frame start shift based on the current VSYNC present latencies being observed by the client device 104. Thus, for subprocess 404 performed at the client device 104, at block 424 the VSYNC present analysis module 220 monitors the VSYNC present latencies for video frames recently decoded and presented from the data stream 114 and at block 426 the VSYNC present analysis module 220 transmits VSYNC present latency feedback 116 to the gaming server 102 via the network(s) 106, the VSYNC present latency feedback 116 representing a statistical representation or other representation of recent VSYNC present latencies observed at the client device 104. For example, in some implementations, the VSYNC present analysis module 220 can measure the time span between when a decoded frame is available to present and when the next VSYNC signal is asserted for the last N frames, and provide these time span measurements as the VSYNC present latency feedback 116. In other implementations, the VSYNC present analysis module 220 can perform a statistical analysis on these N measured time spans and provide a statistical representation of the most recent observed VSYNC present latencies as VSYNC present latency feedback 116. For example, the VSYNC present analysis module 220 can determine a simple average or weighted average of the previous N measured time spans and provide this resulting average as a representative current VSYNC present latency for the VSYNC present latency feedback 116. As another example, the statistical representation can include a minimum VSYNC present latency or a maximum VSYNC present latency of the set, and the like.

For subprocess 406, at block 428 the frame start delay analysis module 320 receives the VSYNC present latency feedback 116 and from this feedback determines a suitable frame start delay to implement to shift the frame starts of one or more subsequent frame rendering processes so as to reduce the VSYNC present latencies observed at the client device 104. A suitable frame start delay can be determined from the VSYNC present latency feedback 116 in any of a variety of ways. However, an overly-aggressive frame start delay can result in the resulting decoded frames being over-delayed and missing the next VSYNC signal assertion, and thus resulting in an excessively long VSYNC present latency as the next following VSYNC signal assertion must then be used. As such, in implementations some form of guard against over-delay can be employed, such as the use of head room to account for changes in the various latencies that contribute to frame latency, such as network jitter or bandwidth changes, changes in resource allocations that impact rendering, encoding, or decoding efficiencies, and the like. For example, if the VSYNC present latency feedback 116 includes the measured time spans for the previous N frames presented at the client device 104, the frame start delay analysis module 320 can select a frame start delay based on the smallest measured time span in the set of N measured time spans. For example, if the smallest measured time span is 6 ms, a suitable frame start delay could be set to, for example, 4 ms, or 2 ms less than the smallest measured time span to accommodate for frame latency changes. As another example, a statistical distribution of the N measured time spans may be determined, and the frame start delay based on the second deviation (less some fixed or relative indicated headroom amount to allow for changes in frame latency).

With a suitable frame start delay determined, at block 430 the frame start delay analysis module 320 configures the rendering pipeline of the gaming server 102 via control signaling 118 (FIG. 1) to implement a frame start shift commensurate with the determined frame start delay in the next frame rendering available for shifting. For example, if the frame start delay at block 428 is determined as 4 ms, then at block 430 the start of the rendering process for the next frame is shifted 4 ms, which in turn shifts the start of the rendering process for the following frame by 4 ms, and so forth. This frame start shift can be implemented in any of a variety of ways. To illustrate, as explained above, the end of one frame rendering process and the start of the next frame rendering process can be signaled by the video game instance 108 via issuance of a present call for the frame just rendered, which in turn initiates the rendering process for the next frame. As such, in one embodiment, the frame start shift can be implemented by configuring the UMD 316-1 (or the video game instance 108 itself) via the control signaling 118 to hold the return point of the present call issued for the previous frame rendering by an amount of time equal to the determined frame start delay, which would have the effect of delaying the start of the next frame, and the starts of subsequent frames, by a time equal to the determined frame start delay.

As explained above, in some implementations, the frame start delay determined at block 428 is implemented as a single frame start shift. That is, if the frame start delay is determined to be 3 ms, then a single frame start shift of 3 ms is introduced, thereby shifting the next frame start, and following frame starts, by 3 ms. However, in some circumstances, the frame start delay may be relatively substantial and implementing it in a single frame start shift could introduce significant one-time frame latency that is perceptible to the user as lag. Accordingly, in some embodiments, the determined frame start delay may be implemented as a sequence of smaller frame start shifts to smooth out the frame rate over the total adjustment. For example, a 9 ms frame start delay may be implemented as three 3 ms frame start shifts in a row, so that a first frame start for a first frame rendering is shifted back 3 ms, a second frame start for the following second frame rendering is shifted back 3 ms (or 6 ms relative to what would have been its unshifted frame start time), and a third frame start for the following third frame rendering is shifted back an additional 3 ms (or 9 ms relative to what would have been its unshifted frame start time), and thus third frame start and subsequent frame starts all having implemented the total 9 ms frame start delay. This smoothing approach may be implemented by default or may be implemented in response to the determined frame start delay exceeding a specified threshold (e.g., X % of the total frame period or a fixed threshold determined based on, for example, the resulting detectability to the human eye).

One consideration when implementing the frame start shift is, in some implementations, to permit the entire render-streaming pipeline to be shifted in accordance with a determined frame start delay while maintaining the expected capped frame rate of the VSYCN-activated client device based on the display panel's refresh rate. To this end, in some embodiments either the video game instance 108 or the UMD of the graphics driver 216 of the client device 104 can be configured to replace VSYNC-ON present calls with VSYNC-OFF present calls and then apply FPS capping to match the refresh rate of the display panel 210. Moreover, if this approach is employed, the client device 104 can be configured to continue to employ VSYNC-ON present calls. If implemented by the video game instance 108, this may be achieved through notification from the server streaming application 318 to the client streaming application 218. If implemented by the graphics drivers 316, then the UMD 316-1 may override the VSYNC-ON present call from the video game instance 108 and replace it with a VSYNC-OFF present call in order to avoid potential latency caused by handling of the VSYNC-ON present by the OS 214. Moreover, the FPS cap implied by the VSYNC-ON present call can be implemented by, for example, controlling the game's frame start using a corresponding repeating timer. To illustrate, when the UMD 316-1 unblocks a frame's frame start, thereby allowing the frame rendering process to start for that frame, the UMD 316-1 can also start a timer that expires in M milliseconds (where M=the frame period at the capped FPS, such as 16.667 ms for 60 FPS), and block the start of the next frame's frame start until the timer expires, and then repeat the same process for this next frame.

Server streaming applications, such as server streaming application 318, trigger the inclusion of encoded frames into the outgoing data stream in one of two ways: polling, in which the server streaming application polls frames according to its own determined timing; and frame-driven, in which the completion of a frame by the video game instance triggers the servers streaming application to stream the frame. As frame start shifts may interfere with the frame-completion/polling timing when a polling mode is used, the server streaming application optimally is configured to use frame-driven streaming so that the timing of the inclusion of frames into the outgoing data stream 114 automatically adapts to inserted frame start shifts.

Figure 5:
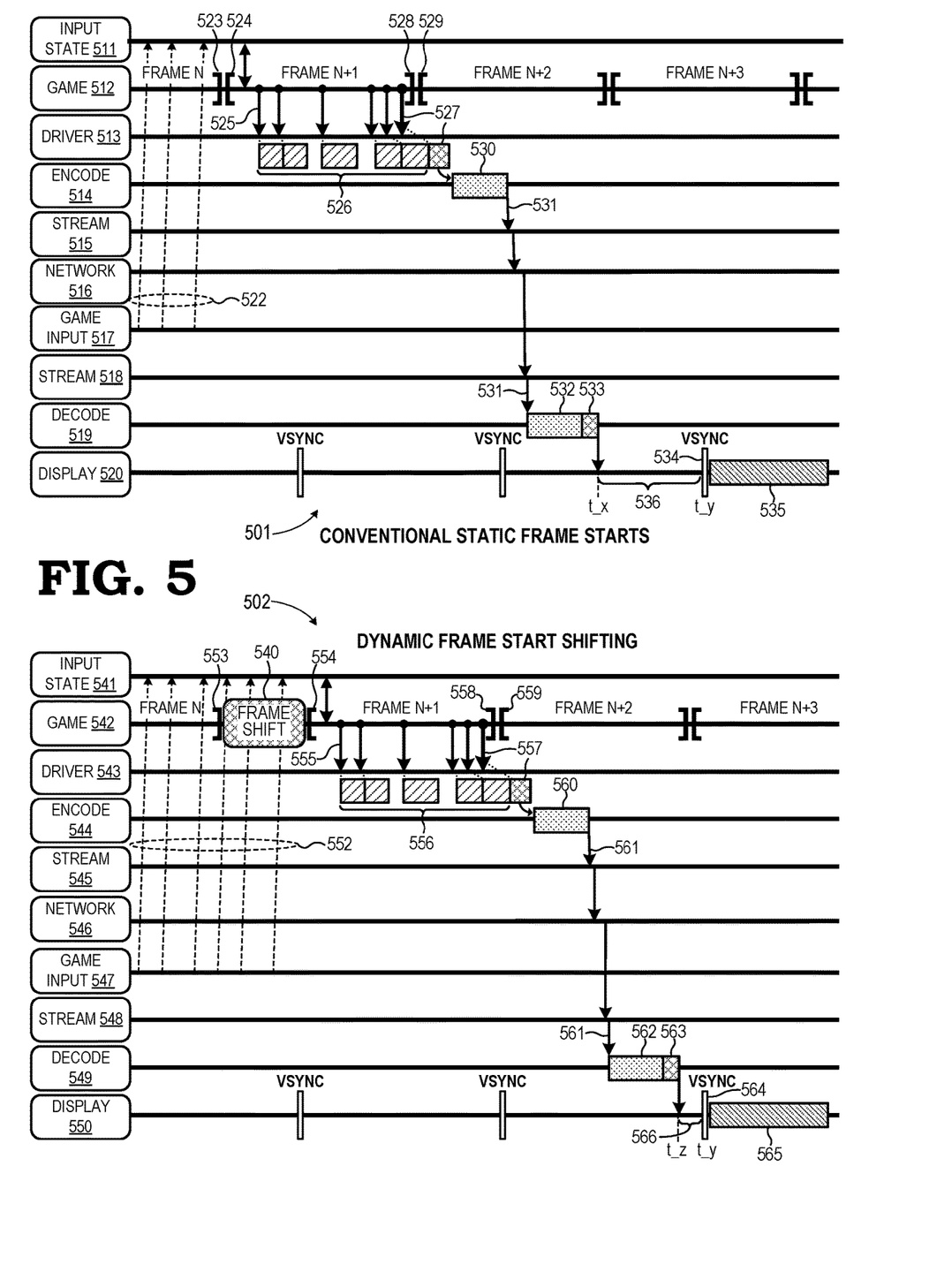
FIG. 5 is a set of timing diagrams illustrating a conventional VSYNC-activated streaming pipeline and a VSYNC-activated streaming pipeline implementing dynamic frame start delay in accordance with some embodiments of the present disclosure.

FIG. 5 illustrates two example timing diagrams, including a timing diagram 501 representing the streaming timings in a conventional approach without dynamic frame start shifting and a timing diagram 502 representing the streaming timings using the approaches described herein with dynamic frame start shifting. For timing diagram 501, row 511 represents the timing of receipt of gaming inputs and other input contexts for an executing video game context at a conventional gaming server, row 512 represents the executing video game instance itself, row 513 represents timing for the graphics driver associated with the video game instance, row 514 represents timing for the encoder of the gaming server, row 515 represents the timing for the server streaming application of the gaming server, row 516 represents the timing for the network, row 517 represents timing for the submission of gaming inputs from a client device, row 518 represents timing for a client streaming application of the client device, row 519 represents timing for a decoder of the client device, and row 520 represents timing for a VSYNC-timed display panel of the client device.

As shown in timing diagram 501, during the frame rendering process for a frame N, gaming inputs 522 are received from the client device and buffered at the gaming server. A present call or other trigger signals a frame end 523 and a frame start 524 for rendering of frame N+1. Accordingly, the gaming inputs and other gaming context is implemented by the executing video game instance to update the game world simulation implemented thereby, and the video game instance begins issuing a sequence of rendering jobs (e.g., rendering jobs 525) to the UMD, which in turn coordinates with the KMD and OS of the gaming server to execute the sequence of rendering jobs to render 526 the frame N+1. With completion of rendering of frame N+1, the video game instance issues a present call 527. This present call 527 signals both the frame end 528 for frame N+1 and the frame start 529 for frame N+2, as well as triggers the encoder to encode 530 the rendered frame N+1, resulting in an encoded frame N+1 (encoded frame 531) that is inserted into a data stream being transmitted to the client device by the server streaming application of the gaming server. At the client device side, the encoded frame N+1 is extracted by the client streaming application and decoded 532 by a decoder of the client device. Once decoding is complete, the graphics driver of the client device issues a present call 533, signaling that the decoded frame N+1 is ready to present.

As shown by row 520, the display panel of the client device is timed using VSYNC timing, with VSYNC signal assertions (e.g., VSYNC signal assertion 534) being asserted at an indicated frequency representing the frame rate of the display panel. When VSYNC timing is employed, presentation of a frame typically only occurs when a VSYNC signal is asserted. Accordingly, even though the decoded frame N+1 is available to present at time t_x, the actual presentation 535 of decoded frame N+1 is delayed until assertion of the next VSYNC signal assertion (VSYNC signal assertion 534 in this case) at time t_y. As such, the conventional game streaming system represented by timing diagram 501 has a VSYNC present latency 536 of t_y−t_x.

For timing diagram 502, row 541 represents the timing of receipt of gaming inputs 110 and other input contexts for the video game instance 108 at the gaming server 102, row 542 represents the executing video game instance 108 itself, row 543 represents timing for the graphics drivers 316 associated with the video game instance, row 544 represents timing for the encoder 322 of the gaming server 102, row 545 represents the timing for the server streaming application of the gaming server 102, row 546 represents the timing for the network 106, row 547 represents timing for the submission of gaming inputs 110 from the client device 104, row 548 represents timing for the client streaming application 218 of the client device 104, row 549 represents timing for the decoder 222 of the client device 104, and row 550 represents timing for the VSYNC-timed display panel 210 of the client device 104.

As shown in timing diagram 502, during the frame rendering process for a frame N, gaming inputs 522 are received from the client device and buffered at the gaming server. A present call or other trigger signals a frame end 553 for frame N. However, rather than immediately starting the rendering process for the next frame N+1, the gaming server 102 instead introduces a frame start shift 540 that delays, or shifts, the frame start 524 for frame N+1 by X ms (where X<the total frame period). As described above, X can be determined based on feedback received from the client device 104 regarding recently observed VSYNC present latencies at the client device 104, such as by setting X equal to the lowest recent VSYNC present latency or setting X equal to a weighted average of the recent VSYNC present latencies minus some padding to accommodate for frame latency jitter. With the frame start 554 shifted by X ms, the rendering of frame N+1 initiates thereafter with the executing video game instance 108 implementing the gaming inputs 552 to update the game world simulation implemented thereby, and the video game instance 108 begins issuing a sequence of rendering jobs (e.g., rendering jobs 555) to the UMD 316-1, which in turn coordinates with the KMD 316-2 and OS 314 of the gaming server 102 to execute the sequence of rendering jobs to render 556 the frame N+1. With completion of rendering of frame N+1, the video game instance 108 issues a present call 557, which signals both the frame end 558 for frame N+1 and the frame start 559 for frame N+2, as well as triggers the encoder 322 to encode 560 the rendered frame N+1, resulting in an encoded frame N+1 (encoded frame 561) that is inserted into the data stream 114 being transmitted to the client device 104 by the server streaming application 318. At the client device 104, the encoded frame N+1 is extracted by the client streaming application 218 and decoded 562 by the decoder 222. Once decoding is complete, the graphics driver 216 of the client device 104 issues a present call 563, signaling that the decoded frame N+1 is ready to present.

As shown by row 550, the display panel of the client device is timed using VSYNC timing, with VSYNC signal assertions (e.g., VSYNC signal assertion 564) being asserted at an indicated frequency representing the frame rate of the display panel. Accordingly, while the decoded frame N+1 is available to present at time t_z, the actual presentation 565 of decoded frame N+1 is delayed until assertion of the next VSYNC signal assertion (VSYNC signal assertion 564 in this case) at time t_y. As such, in this example, the remove video gaming system 100 presently has a VSYNC present latency 566 of t_z−t_x.

Comparing timing diagrams 501 and 502, it is observed that the durations of the various latencies that contribute to the total frame latency for frame N+1 are the same, except for the VSYNC present latencies, with the VSYNC present latency 536 of the conventional approach being X ms longer than the VSYNC present latency 566 of the dynamic frame start shift approach. As such the total frame latency of the dynamic frame start shift approach represented in timing diagram 502 is X ms less than the total frame latency for the conventional approach represented in timing diagram 501. Moreover, in many circumstances, such as the circumstances illustrated in these timing diagrams, this reduction in VSYNC present latency, and thus reduction in overall frame latency does not have a cost with respect to even a momentary degradation in the visual presentation to the user. To wit, the timing of the presentations of frames N, N+1, N+2, and so forth, remains the same in both timing diagram 501 and timing diagram 502, so a user would not note a difference in the timing of presentation of the frames even with the introduction of the X ms of frame start delay. Moreover, the frame start shift has the added benefit from the perspective of improved user experience in that by shifting the start of the frame rendering process closer to the point where the resulting rendered frame ultimately is displayed at the client device, the video gaming instance 108 is able to incorporate additional and more recent gaming inputs 110 into the game play/world simulation before initiating rendering of a frame, and thus improve the user's perspective of responsiveness of the gaming to user gaming inputs.

As explained above, a goal of some implementations of the dynamic frame start shift process is to shift the frame starts of the frame rendering processes for a series of frames to a later time so as to move the point at which the frames are ready for presentation at the client device 104 closer to the corresponding VSYNC signal assertion triggers that permit their actual presentations. However, in some cases, there may be a substantial shift in the latencies introduced in one or more of the rendering, encoding, transmission, or decoding processes, or the frame start delay determined for an implemented frame start shift may have been excessive given the circumstances (e.g., a significant outlier in the observed VSYNC present latencies at the client device 104). In such instances, the frame start shift may result in a decoded frame missing its VSYNC signal assertion; that is, the decoded frame is not available to present until after its VSYNC signal assertion has already passed. This has the result of the client device 104 having to buffer the decoded frame until the following VSYNC signal is asserted, at which point the buffered frame can be presented. The result is rather than having a VSYNC present latency that is only a fraction of a VSYNC period, the VSYNC present latency is stretched to being longer than a VSYNC period by virtue of the missed VSYNC signal assertion.

Figure 6:
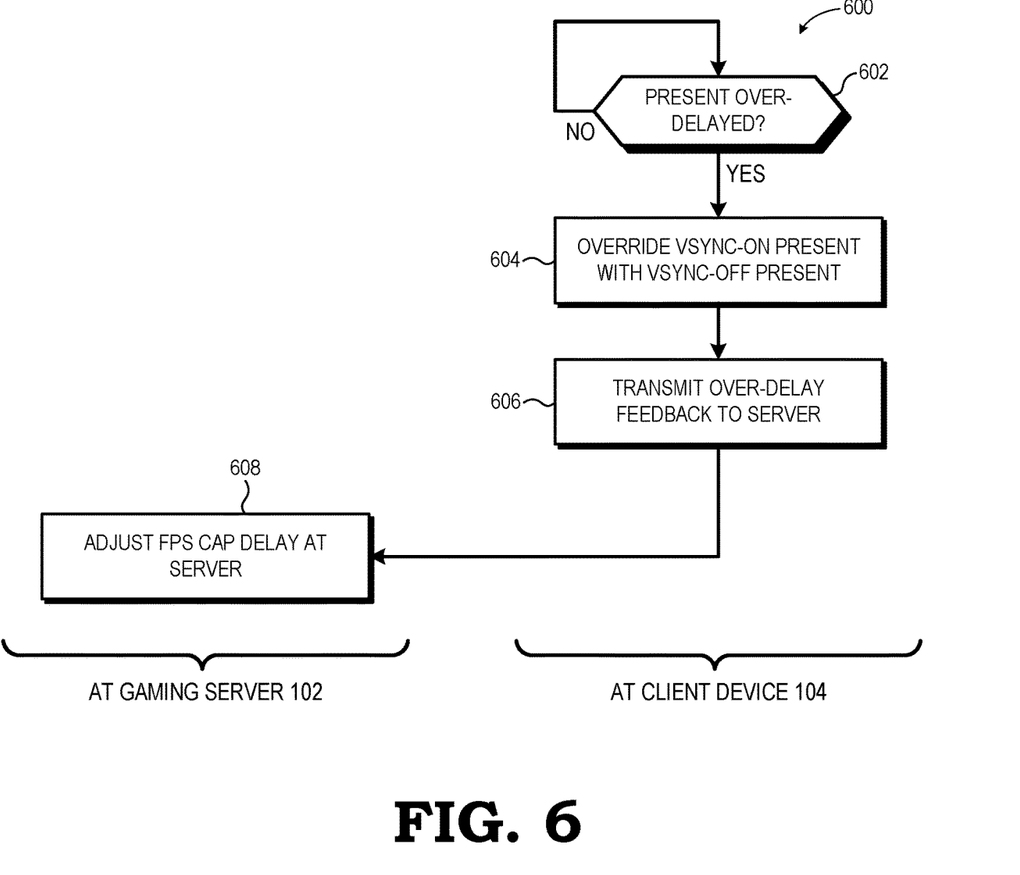
FIG. 6 is a diagram illustrating a method for frame start over-delay control in accordance with some embodiments.

FIG. 6 illustrates a method 600 for accommodating this excessive delay, or over-delay, introduced into the frame start shift process in accordance with some embodiments. At block 602, the graphics driver 216 of the client device 104 monitors for an over-delay condition by determining whether the availability of frame being decoded (or that has been decoded) for presentation is going to extend past the VSYNC signal assertion intended to trigger the presentation of the frame. If an over-delay condition is detected, at block 604 the graphics driver 216 overrides the VSYNC-ON requirement for frame presentation and issues a VSYNC-OFF present call for the frame, thereby triggering the client device 104 to present the frame for display shortly thereafter, rather than requiring the presentation wait for the next VSYNC signal assertion. This results in an abbreviated VSYNC present latency for the current frame. However, subsequent frames may be likewise over-delayed, and it would be in violation of the VSYNC-ON setting to continue to present subsequent frames with VSYNC-OFF. Accordingly, at block 606 the VSYNC present analysis module 220 transmits VSYNC present latency feedback 116 to the frame start delay analysis module 320 indicating this over-delay condition. At block 608, the frame start delay analysis module 320 and the UMD 316-1 respond to this feedback to adjust the frame start delay by overriding the VSYNC-ON present of the video game instance 108 with a VSYNC-OFF present and achieve the VSYNC-latched FPS by controlling the frame starts of the video game instance based on a timer, as explained above.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method performed at a server, comprising:
rendering a sequence of video frames of a stream of video, encoding the video frames of the sequence to generate a stream of encoded video frames, and transmitting the stream of encoded video frames to a client device, wherein rendering of each video frame in the sequence is initiated by a corresponding frame start trigger;
receiving feedback from the client device regarding observed vertical synchronization (VSYNC) present latencies for video frames of the stream of video previously presented at the client device, wherein the observed VSYNC present latencies are based on when decoded video frames are available to present at the client device and when the decoded frames are permitted to present; and
introducing a frame start delay that shifts back frame start triggers for a video frame and subsequent video frames of the sequence, the frame start delay based on the feedback from the client device.

2. The method of claim 1, wherein the observed VSYNC present latencies represent latencies between when decoded video frames from the stream of encoded video frames are available to present at the client device and when the decoded video frames are permitted to present at the client device responsive to VSYNC timing.

3. The method of claim 1, wherein the sequence of video frames is rendered for an instance of a video game application executing at the server on behalf of the client device.

4. The method of claim 1, wherein:
receiving feedback from the client device comprises receiving a set of recently observed VSYNC present latencies from the client device; and
the method further comprises:
determining the frame start delay based on the set of recently observed VSYNC present latencies.

5. The method of claim 4, wherein determining the frame start delay comprises determining the frame start delay based on a statistical representation of the recently observed VSYNC present latencies of the set.

6. The method of claim 5, wherein determining the frame start delay further comprises determining the frame start delay based on an indicated headroom amount to provide for changes in frame latency.

7. The method of claim 1, wherein:
the frame start trigger is a present call; and
introducing the frame start delay includes delaying a present call for a video frame of the sequence by a duration equal to the frame start delay.

8. The method of claim 1, wherein introducing a frame start delay that shifts back frame start triggers for a video frame and subsequent video frames of the sequence comprises:
responsive to determining the frame start delay exceeds a specified threshold, gradually introducing the frame start delay for frame start triggers over a number of video frames of the sequence.

9. A server comprising:
a network interface coupleable to at least one network;
at least one processor coupled to the network interface; and
at least one memory coupled to the at least one processor, the at least one memory storing executable instructions to manipulate the at least one processor to:
  render a sequence of video frames of a stream of video, encode the video frames of the sequence to generate a stream of encoded video frames, and provide the stream of encoded video frames for transmission to a client device, wherein rendering of each video frame in the sequence is initiated by a corresponding frame start trigger;
  receive feedback from the client device regarding observed vertical synchronization (VSYNC) present latencies for video frames of the stream of video previously presented at the client device, wherein the observed VSYNC present latencies are based on when decoded video frames are available to present at the client device and when the decoded frames are permitted to present; and
  introduce a frame start delay that shifts back frame start triggers for a video frame and subsequent video frames of the sequence, the frame start delay based on the feedback from the client device.

10. The server of claim 9, wherein the observed VSYNC present latencies represent latencies between when decoded video frames from the stream of encoded video frames are available to present at the client device and when the decoded video frames are permitted to present at the client device responsive to VSYNC timing.

11. The server of claim 9, wherein the sequence of video frames is rendered for an instance of a video game application executing at the server on behalf of the client device.

12. The server of claim 9, wherein:
the executable instructions to manipulate the at least one processor to receive feedback from the client device comprise executable instructions to manipulate the at least one processor to receive a set of recently observed VSYNC present latencies from the client device; and
the executable instructions further are to manipulate the at least one processor to determine the frame start delay based on the set of recently observed VSYNC present latencies.

13. The server of claim 12, wherein the executable instructions are to manipulate the at least one processor to determine the frame start delay based on a statistical representation of observed VSYNC present latencies of the set.

14. The server of claim 9, wherein:
the frame start trigger is a present call; and
wherein the executable instructions to manipulate the at least one processor to introduce the frame start delay include executable instructions to manipulate the at least one processor to delay a present call for a video frame of the sequence by a duration equal to the frame start delay.

15. A method performed at a client device, comprising:
receiving, from a server via at least one network, a stream of encoded video frames, decoding the stream of encoded video frames to generate a stream of decoded video frames, and presenting the stream of decoded video frames for display according to a vertical synchronization (VSYNC) timing;
observing VSYNC present latencies for video frames of the stream of decoded video frames at the client device, wherein the observed VSYNC present latencies are based on when decoded video frames are available to present at the client device and when the decoded frames are permitted to present; and
transmitting feedback to the server regarding the observed VSYNC present latencies.

16. The method of claim 15, wherein the observed VSYNC present latencies represent latencies between when decoded video frames from the stream of encoded video frames are available to present at the client device and when the decoded video frames are permitted to present at the client device responsive to VSYNC timing.

17. The method of claim 15, wherein the stream of encoded video frames is rendered for an instance of a video game application executing at the server on behalf of the client device.

18. The method of claim 15, wherein the feedback includes at least one of: observed VSYNC present latencies for a set of previously-presented decoded frames from the stream of encoded video frames; or a statistical representation of the observed VSYNC present latencies for the set of previously-presented decoded frames.

19. The method of claim 15, further comprising:
responsive to determining that a decoded video frame of the stream of decoded video frames will be available to present subsequent to a corresponding VSYNC signal assertion:
  configuring the client device to present the decoded video frame independent of VSYNC timing; and
  providing feedback for transmission to the server, the feedback indicating that the decoded video frame missed the corresponding VSYNC signal assertion.

20. A client device comprising:
a network interface coupleable to at least one network;
at least one processor coupled to the network interface; and
at least one memory coupled to the at least one processor, the at least one memory storing executable instructions to manipulate the at least one processor to:
  receive, from a server via the at least one network, a stream of encoded video frames, decode the stream of encoded video frames to generate a stream of decoded video frames, and present the stream of decoded video frames for display according to a vertical synchronization (VSYNC) timing;
  observe VSYNC present latencies for video frames of the stream of decoded video frames at the client device, wherein the observed VSYNC present latencies are based on when decoded video frames are available to present at the client device and when the decoded frames are permitted to present; and
  transmit feedback to the server regarding the observed VSYNC present latencies.

21. The client device of claim 20, wherein the observed VSYNC present latencies represent latencies between when decoded video frames from the stream of encoded video frames are available to present at the client device and when the decoded video frames are permitted to present at the client device responsive to VSYNC timing.

22. The client device of claim 20, wherein the stream of encoded video frames is rendered for an instance of a video game application executing at the server on behalf of the client device.

23. The client device of claim 20, wherein the feedback includes at least one of: observed VSYNC present latencies for a set of previously-presented decoded frames from the stream of encoded video frames; or a statistical representation of the observed VSYNC present latencies for the set of previously-presented decoded frames.

24. The client device of claim 20, wherein the executable instructions are further to manipulate the at least one processor to:

responsive to determining that a decoded video frame of the stream of decoded video frames will be available to present subsequent to a corresponding VSYNC signal assertion:

configure the client device to present the decoded video frame independent of VSYNC timing; and provide feedback for transmission to the server, the feedback indicating that the decoded video frame missed the corresponding VSYNC signal assertion.

\* \* \* \* \*